(12) United States Patent
Hoshino

(10) Patent No.: US 7,095,984 B2
(45) Date of Patent: Aug. 22, 2006

(54) BASE STATION APPARATUS AND DIRECTION-OF-ARRIVAL ESTIMATING METHOD

(75) Inventor: Masayuki Hoshino, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 668 days.

(21) Appl. No.: 10/129,378

(22) PCT Filed: Aug. 31, 2001

(86) PCT No.: PCT/JP01/07517

§ 371 (c)(1),
(2), (4) Date: May 3, 2002

(87) PCT Pub. No.: WO02/21723

PCT Pub. Date: Mar. 14, 2002

(65) Prior Publication Data

US 2002/0183007 A1 Dec. 5, 2002

(30) Foreign Application Priority Data

Sep. 8, 2000 (JP) ........................... 2000-272543

(51) Int. Cl.
*H04B 17/00* (2006.01)

(52) U.S. Cl. ............... 455/67.16; 455/63.1; 455/562.1; 455/101; 455/575.7; 455/570; 455/561; 342/457; 342/383; 342/442; 342/148; 342/357.1; 375/148; 375/347; 370/335; 370/342; 370/442

(58) Field of Classification Search ............. 455/67.16, 455/562.1, 575.7, 101, 63.1, 570; 342/457, 342/383, 442, 357.1, 378, 417, 148; 370/335, 370/342, 442

See application file for complete search history.

(56) References Cited

U.S. PATENT DOCUMENTS

| 5,936,575 | A | * | 8/1999 | Azzarelli et al. | 342/362 |
|---|---|---|---|---|---|
| 6,008,759 | A | * | 12/1999 | Tangemann et al. | 342/368 |
| 6,064,338 | A | * | 5/2000 | Kobayakawa et al. | 342/378 |
| 6,075,484 | A | * | 6/2000 | Daniel et al. | 342/372 |
| 6,122,260 | A | * | 9/2000 | Liu et al. | 370/280 |
| 6,240,098 | B1 | * | 5/2001 | Thibault et al. | 370/431 |
| 6,311,043 | B1 | * | 10/2001 | Haardt et al. | 455/67.16 |
| 6,333,713 | B1 | * | 12/2001 | Nakagawa et al. | 342/418 |
| 6,349,218 | B1 | * | 2/2002 | Nakagawa et al. | 455/562.1 |

(Continued)

FOREIGN PATENT DOCUMENTS

| JP | 11041157 | 2/1999 |
|---|---|---|
| JP | 11251964 | 9/1999 |

(Continued)

OTHER PUBLICATIONS

International Search Report dated Dec. 4, 2001.
Japanese Office Action dated Mar. 30, 2004 with English translation.

(Continued)

*Primary Examiner*—Marceau Milord
(74) *Attorney, Agent, or Firm*—Stevens, Davis, Miller & Mosher, LLP

(57) ABSTRACT

Signals including a plurality of components representing a phase rotation between antenna elements by combining signals, which have arrived through each path of a first to an m-th paths, for every antenna are generated in RAKE combining sections 104-1 to 104-n; one angle spectrum is obtained in one direction-of-arrival estimation section 105 provided in each communication terminal, using the signals generated in the RAKE combining sections 104-1 to 104-n; and a plurality of directions-of-arrival are estimated en bloc by detecting a plurality of peak positions on the angle spectrum.

8 Claims, 5 Drawing Sheets

U.S. PATENT DOCUMENTS

| | | | |
|---|---|---|---|
| 6,385,181 B1 * | 5/2002 | Tsutsui et al. | 370/335 |
| 6,567,462 B1 | 5/2003 | Brunner et al. | |
| 6,670,919 B1 * | 12/2003 | Yoshida | 342/378 |
| 6,744,407 B1 * | 6/2004 | Ferreol | 342/441 |

FOREIGN PATENT DOCUMENTS

| | | |
|---|---|---|
| JP | 11261964 | 9/1999 |
| JP | 11298345 | 10/1999 |
| JP | 2000022611 | 1/2000 |
| JP | 2000059278 | 2/2000 |
| JP | 200082977 | 3/2000 |
| JP | 2000147083 | 5/2000 |
| JP | 2000196328 | 7/2000 |

OTHER PUBLICATIONS

Japanese Office Action dated Mar. 30, 2004 with English translation.

Japanese Office Action dated Jul. 5, 2005 with English translation.

Kikuma et al,; "Adaptive Signal Processing With Array Antenna", pp. 173–181, with English translation, Sep. 1999.

* cited by examiner

BASE STATION APPARATUS AND DIRECTION-OF-ARRIVAL ESTIMATING METHOD

TECHNICAL FIELD

The present invention relates to a base station apparatus provided with an array antenna, which is used in a digital radio communication system, and a direction-of-arrival estimating method.

BACKGROUND ART

Interference by various kinds of signals causes deterioration in received quality of a signal which a base station apparatus receives. An array antenna has been known as a technology for controlling the interference, and for strongly receiving only a signal arriving from a desired direction. The array antenna comprises a plurality of antenna elements, and is an antenna for arbitrarily setting a directivity by adjusting the amplitudes and phases of signals received through each antenna element. By using the array antenna, only a signal arriving from a desired direction may be strongly received by adjusting a weighting coefficient (hereinafter, called as "weight") by which the received signal is multiplied, and by regulating the amplitudes and phases of the received signal.

Moreover, there is a RAKE receiving technology as a technology for improving the received quality. By using the RAKE receiving, path diversity gain may be obtained by combining signals arriving through different paths from each other under a multipath environment on a time axis. Generally, even in a base station apparatus provided with the array antenna, the RAKE receiving is often used together.

In this case, the base station apparatus estimates each direction-of-arrival for signals arriving through paths respectively, and receives signals through the array antenna forming directivities in the estimated directions. Hereinafter, a conventional base station apparatus performing the array receiving and the RAKE receiving together will be described.

FIG. 1 is a block diagram showing a configuration of the conventional base station apparatus. In the base station apparatus, signals received through antennas 11-1 to 11-n are input to despreading sections 13-1 to 13-m after predetermined radio processing (such as down conversion, and analog to digital conversion) in RF sections 12-1 to 12-n provided corresponding to each antenna.

The despreading sections 13-1 to 13-m perform despreading processing of signals arriving respectively through a first path to an m-th path. That is, the despreading sections 13-1 to 13-m perform the despreading processing according to receiving timing of the signals arriving through each path. Thereby, signals passed through the first path (hereinafter, called as "the path-1 signals") which have been received through the antennas 11-1 to 11-n are extracted by the despreading sections 13-1, respectively, and signals passed through the m-th path (hereinafter, called as "the path-m signals") which have been received through the antennas 11-1 to 11-n are extracted by the despreading sections 13-m, respectively. N number of the path-1 signals are input to a direction-of-arrival estimation section 14-1 and an array receiving section 15-1, and N number of the path-m signals are input to a direction-of-arrival estimation section 14-m and an array receiving section 15-m.

In the direction-of-arrival estimation sections 14-1 to 14-m, directions-of-arrival $\theta_1$ to $\theta_m$ of the path-1 to path-m signals are estimated. The estimated directions-of-arrival $\theta_1$ to $\theta_m$ are input to the array receiving sections 15-1 to 15-m, respectively.

In the array receiving section 15-1, the path-1 signals received through each antenna are multiplied by a receiving weight generated by using the direction-of-arrival $\theta_1$, and, then, the signals subjected to the multiplication are combined. Thereby, the path-1 signals subjected to array combining are output from the array receiving section 15-1. Similarly, the path-m signals subjected to array combining are output from the array receiving section 15-m.

Channel fluctuations $h_1$ to $h_m$ are compensated by multiplication of the signals subjected to array combining by complex conjugates $h_1'^*$ to $h_m'^*$ of channel estimation values $h_1'$ to $h_m'$, and, thereafter, RAKE combining of the signals is performed in a RAKE combining section 16. The signals subjected to the RAKE combining are demodulated in a demodulation section 17, and, thereby, demodulated data are obtained.

Subsequently, operations for estimating a direction-of-arrival, which are executed in the above conventional base station apparatus, will be described. Here, it is assumed for easy description that received signals arrive through two paths of the path 1 and the path 2, and an array antenna comprises two antenna elements of the antennas 11-1 and 11-2. In a word, description will be made under assumption of m=2 and n=2 in the block diagram shown in FIG. 1. Moreover, it is assumed that each antenna element is arranged straight at intervals of the half wave-length of a carrier wave.

Generally, the path-m signal received through an n-th antenna element may be expressed as the following formula (1).

$$x_{nm}(t) = h_m e^{j\pi(n-1)\sin\theta_m} \cdot s(t) \qquad (1)$$

In the above formula (1), $h_m$ represents a channel fluctuation on the path m; $\theta_m$ a direction-of-arrival of the path-m signal; and s(t) a desired signal.

Moreover, $e^{j\pi(n-1)\sin\theta_m}$ represents a phase rotation between each antenna element. Here, it is assumed for easy description that interference components and noise components included in the received signal may be neglected.

Accordingly, the path-1 signal received through the antenna 11-1 is expressed as the following formula (2); the path-1 signal received through the antenna 11-2 is expressed as the following formula (3); the path-2 signal received through the antenna 11-1 is expressed as the following formula (4); and the path-2 signal received through the antenna 11-2 is expressed as the following formula (5):

$$x_{11}(t) = h_1 \cdot s(t) \qquad (2)$$

$$x_{21}(t) = h_1 e^{j\pi \sin\theta_1} \cdot s(t) \qquad (3)$$

$$x_{12}(t) = h_2 \cdot s(t) \qquad (4)$$

$$x_{22}(t) = h_2 e^{j\pi \sin\theta_2} \cdot s(t) \qquad (5)$$

The direction-of-arrival estimation section 14-1 estimates a direction-of-arrival $\theta_1$, using the signal expressed in the above formula (2), and the signal expressed in the above formula (3). Similarly, the direction-of-arrival estimation section 14-2 estimates a direction-of-arrival $\theta_2$, using the signal expressed in the above formula (4), and the signal expressed in the above formula (5). Specifically, the direction-of-arrival is estimated according to the following procedure. Here, it is assumed that a beamformer method is used as one example of methods for estimating the direction-of-arrival.

In the beamformer method, a receiving weight vector $W(\theta)$ by which the signals received through each antenna are multiplied is assumed to be the following formula (6):

$$W(\theta)=[1, e^{-j\pi \sin \theta}, \ldots, e^{-j(n-1)\pi \sin \theta}] \quad (6)$$

Then, directions-of-arrival for signals of each path are estimated by detecting peak positions of angle spectrums $P_{BF}(\theta)$, which is represented by the following formula (7) using an auto-correlation matrix $R_{XX}$ of a received signal X.

$$P_{BF}(\theta) = \frac{W^H(\theta)R_{xx}W(\theta)}{W^H(\theta)W(\theta)}, R_{xx} = E[X(t)X^H(t)] \quad (7)$$

Here, H represents a complex conjugate transposition, and E an average in the above formula (7).

That is, in the direction-of-arrival estimation section 14-1, the signal expressed by the above formula (2), and the signal expressed by the above formula (3) are multiplied by receiving weight vectors expressed by the above formula (6), respectively, and, thereafter, angle spectrums are obtained by the above formula (7), with changing $\theta$. Then, a peak position on the angle spectrum is estimated as the direction-of-arrival $\theta_1$ of the path-1 signal. For example, when an angle spectrum for the path-1 signal is as shown in FIG. 2A, it is estimated that the direction-of-arrival $\theta_1$ is a direction of −40 degrees.

Similarly, in the direction-of-arrival estimation section 14-2, the signal expressed by the above formula (4), and the signal expressed by the above formula (5) are multiplied by receiving weight vectors expressed by the above formula (6), respectively, and, thereafter, angle spectrums are obtained by the above formula (7), with changing $\theta$. Then, a peak position on the angle spectrum is estimated as the direction-of-arrival $\theta_2$ of the path-2 signal. For example, when the angle spectrum for the path-2 signal is as shown in FIG. 2B, it is estimated that the direction-of-arrival $\theta_2$ is a direction of 0 degrees.

However, as angle spectrums are obtained for each path, direction-of-arrival estimation sections for one same operation is required to be provided for each path in the conventional base station apparatus with the above configuration, there has been caused a problem that the apparatus size is increased. When m number of path signals are subjected to RAKE combining, it is required to provide m number of direction-of-arrival estimation sections for one same operation.

Moreover, as operations as expressed in the above formula (6) and the above formula (7) are performed in order to obtain an angle spectrum, there has been a problem in the above conventional base station apparatus that the amount of operations is exponentially increased according to increase in the number of antenna elements and the number of target paths for the RAKE combining.

Moreover, as the above configuration is provided for each communication terminal as shown in FIG. 1, the apparatus size and the amount of operations are further increased, when the number of communication terminals (that is, a number of channels) that the base station apparatus can simultaneously communicate with. The apparatus size and the amount of operations in the base station apparatus have still more increasing tendency along with recent remarkable increase in the number of communication-terminal users.

DISCLOSURE OF INVENTION

The object of the present invention is to provide a base station apparatus and a direction-of-arrival estimating method, by which path-diversity gain may be obtained, and, moreover, the apparatus size may be reduced by reducing the amount of operations at estimating a direction-of-arrival in the base station apparatus with an array antenna.

The inventors of the present invention have noticed signal components required for estimating the direction-of-arrival, and have found that, under assumption that a signal input to a direction-of-arrival estimation section is a signal subjected to RAKE combining, directions-of-arrival for signals on a plurality of paths maybe estimated at once, using one angle spectrum. Then, the present invention has been made.

Now, the present invention has a configuration in which, under a condition that a signal input to the direction-of-arrival estimation section is a signal including a plurality of components representing a phase rotation between each antenna element (that is, $e^{j\pi(n-1)\sin \theta_m}$), the directions-of-arrival for signals on a plurality of paths are estimated at once at one-time direction-of-arrival estimation processing. Thereby, the apparatus size, and the amount of operations of the base station apparatus may be reduced.

BEST MODE FOR CARRYING OUT THE INVENTION

Hereinafter, embodiments of the present invention will be described in detail, referring to drawings.

(Embodiment 1)

Figure 3:
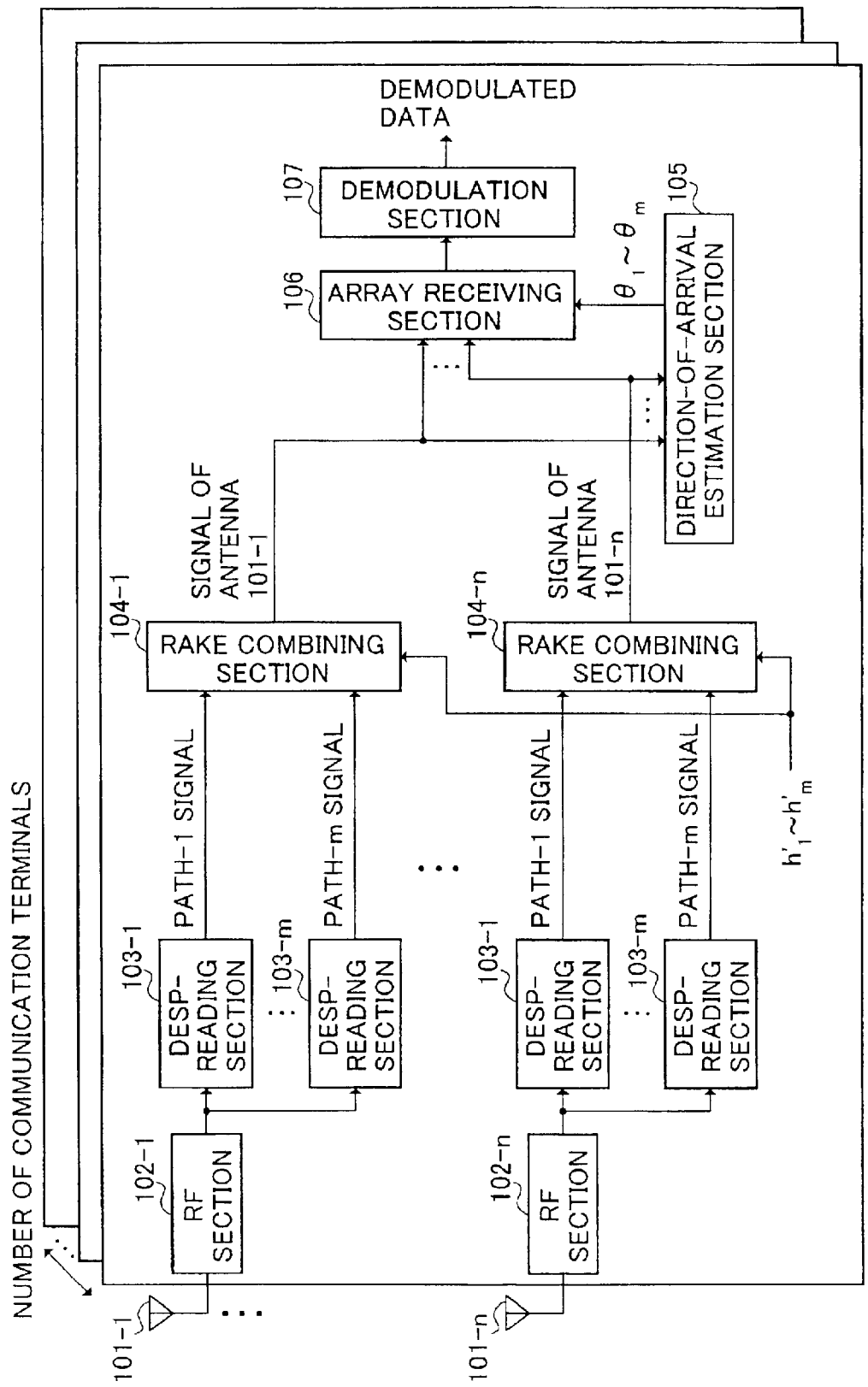
FIG. 3 is a block diagram showing a configuration of a base station apparatus according to an embodiment 1 of the present invention.

FIG. 3 is a block diagram showing a configuration of a base station apparatus according to the embodiment 1 of the present invention. Here, it is assumed in the base station apparatus that a plurality of antennas 101-1 to 101-n are arranged straight at intervals of the half wave-length of a carrier wave.

In the base station apparatus shown in FIG. 3, signals received through the antennas 101-1 to 101-n are input to despreading sections 103-1 to 103-m after predetermined radio processing (such as down conversion, and analog to digital conversion) in RF sections 102-1 to 102-n provided corresponding to each antenna.

The despreading sections 103-1 to 103-m perform despreading processing of the signals which arrive at the antennas 101-1 to 101-n through the paths 1 to m. That is, the despreading sections 103-1 to 103-m perform the despreading processing according to receiving timing of the signals arriving at the antennas 101-1 to 101-n through each path.

Thereby, the path-1 to path-m signals received through the antenna 101-1 are extracted by the despreading sections 103-1 to 103-m connected to the antenna 101-1, respectively. similarly, the path-1 to path-m signals received through the antenna 101-n are extracted by the despreading sections 103-1 to 103-m connected to the antenna 101-n, respectively. The path-1 to path-m signals received through the antenna 101-1 are input to a RAKE combining section 104-1, respectively, and the path-1 to path-m signals received through the antenna 101-n are input to a RAKE combining section 104-n, respectively.

In the RAKE combining section 104-1, channel fluctuations $h_1$ to $h_m$ are compensated by multiplication of the path-1 to path-m signals received through the antenna 101-1 by complex conjugates $h_1'^*$ to $h_m'^*$ of channel estimation values $h_1'$ to $h_m'$, and, thereafter, RAKE combining of the signals is performed. Similarly, in the RAKE combining section 104-n, the channel variations $h_1$ to $h_m$ are compensated by multiplication of the path-1 to path-m signals received through the antenna 101-n by the complex conjugates $h_1'^*$ to $h_m'^*$ of the channel estimation values $h_1'$ to $h_m'$, and, thereafter, RAKE combining of the signals is performed. That is, the path-1 to the path-m signals are combined for each antenna, respectively, in the RAKE combining sections 104-1 to 104-n. The signals through each antenna subjected to RAKE combining are input to the direction-of-arrival estimation section 105, and the array receiving section 106.

Here, there are no special limitations in the channel estimation method. For example, a method for channel estimation using known signals such as pilot symbols included in the received signals may be applied.

The direction-of-arrival estimation section 105 estimates directions-of-arrival $\theta_1$ to $\theta_m$ of the path-1 to path-m signals at once, using the signals through each antenna subjected to the RAKE combining. That is, the direction-of-arrival estimation section 105 estimates directions-of-arrival for signals of a plurality of paths at once, using one angle spectrum. Operations of estimating the directions-of-arrival will be described later. The estimated directions-of-arrival $\theta_1$ to $\theta_m$ are input to the array receiving section 106.

In the array receiving section 106, the signals through each antenna are multiplied by receiving weights generated by using the directions-of-arrival $\theta_1$ to $\theta_m$, and, thereafter, the signals subjected to the multiplication are combined. A method for array combining will be described later. The signals subjected to the array combining are demodulated in a demodulation section 107, and, thereby, demodulated data are obtained.

Then, operations for estimating directions-of-arrival and array combining in the base station apparatus with the above configuration will be described. Here, it is assumed for easy description that the received signals arrive through two paths of the path 1 and the path 2, and the array antenna comprises two antenna elements of the antennas 101-1 and 101-2. That is, description will be made under assumption of m=2 and n=2 in the block diagram shown in FIG. 3.

As described above, the path-m signal received through an n-th antenna element may be expressed as the above formula (1). Accordingly, the path-1 signal received through the antenna 101-1 may be expressed as the following formula (8); the path-2 signal received through the antenna 101-1 as the following formula (9); the path-1 signal received through the antenna 101-2 as the following formula (10); and the path-2 signal received through the antenna 101-2 as the following formula (11).

$$x_{11}(t)=h_1 \cdot s(t) \quad (8)$$

$$x_{12}(t)=h_2 \cdot s(t) \quad (9)$$

$$x_{21}(t)=h_1 e^{j\pi \sin \theta_1} \cdot s(t) \quad (10)$$

$$x_{21}(t)=h_2 e^{j\pi \sin \theta_2} \cdot s(t) \quad (11)$$

Here, it is assumed for easy description that interference components and noise components included in the received signals may be neglected.

Then, the signals expressed by the above formulae (8), (9) are input to the RAKE combining section 104-1; and the signals expressed by the above formulae (10), (11) are input to the RAKE combining section 104-2.

The signals expressed by the above formulae (8), (9) are multiplied by the complex conjugates $h_1'^*$, $h_2'$ of the channel estimation values $h_1'$, $h_2'$, respectively, and, thereafter, RAKE combining of the signals is performed. Accordingly, the signal obtained after RAKE combining of the signal received through the antenna 101-1 is expressed by the following formula (12):

$$X_1(t)=[h_1 h_1'^* + h_2 h_2'^*]s(t) \quad (12)$$

And, the signals expressed by the above formulae (10), (11) are multiplied by the complex conjugates $h_1'^*$, $h_2'^*$ of the channel estimation values $h_1'$, $h_2'$, and, thereafter, RAKE combining of the signals is performed. Accordingly, the signal obtained after the RAKE combining of the signals received through the antenna 101-2 is expressed by the following formula (13):

$$X_2(t)=[h_1 h_1'^* e^{j\pi \sin \theta_1} + h_2 h_2'^* e^{j\pi \sin \theta_2}]s(t) \quad (13)$$

The signals expressed by the above formulae (12), (13) are input to the direction-of-arrival estimation section 105, respectively. Subsequently, the direction-of-arrival estimation section 105 estimates, by one-time processing for direction-of-arrival estimation, the direction-of-arrival $\theta_1$ of the path-1 signal, and the direction-of-arrival $\theta_2$ of the path-2 signal at once, using the signals expressed by the above formulae (12), (13). Specifically, the direction-of-arrival estimation section 105 estimates directions-of-arrival at once according to the following method, using the same method as that of the above conventional case (a beamformer method listed as one example).

That is, in the direction-of-arrival estimation section 105, the signal expressed by the above formula (12), and the signal expressed by the above formula (13) are multiplied by receiving weight vectors expressed by the above formula (6), respectively, and, thereafter, angle spectrums are obtained by the above formula (7), with changing $\theta$.

Here, noticing the signal expressed by the above formula (13), which has been subjected to RAKE combining in the RAKE combining section 104-2, a plurality of components representing a phase rotation between the antenna elements are included in the signal expressed by the above formula (13). That is, both a phase rotation $e^{j\pi \sin \theta_1}$ expressed by using the direction-of-arrival $\theta_1$, and a phase rotation $e^{j\pi \sin \theta_2}$ expressed by using the direction-of-arrival $\theta_2$ are included in the signal expressed by the above formula (13).

Figure 4:
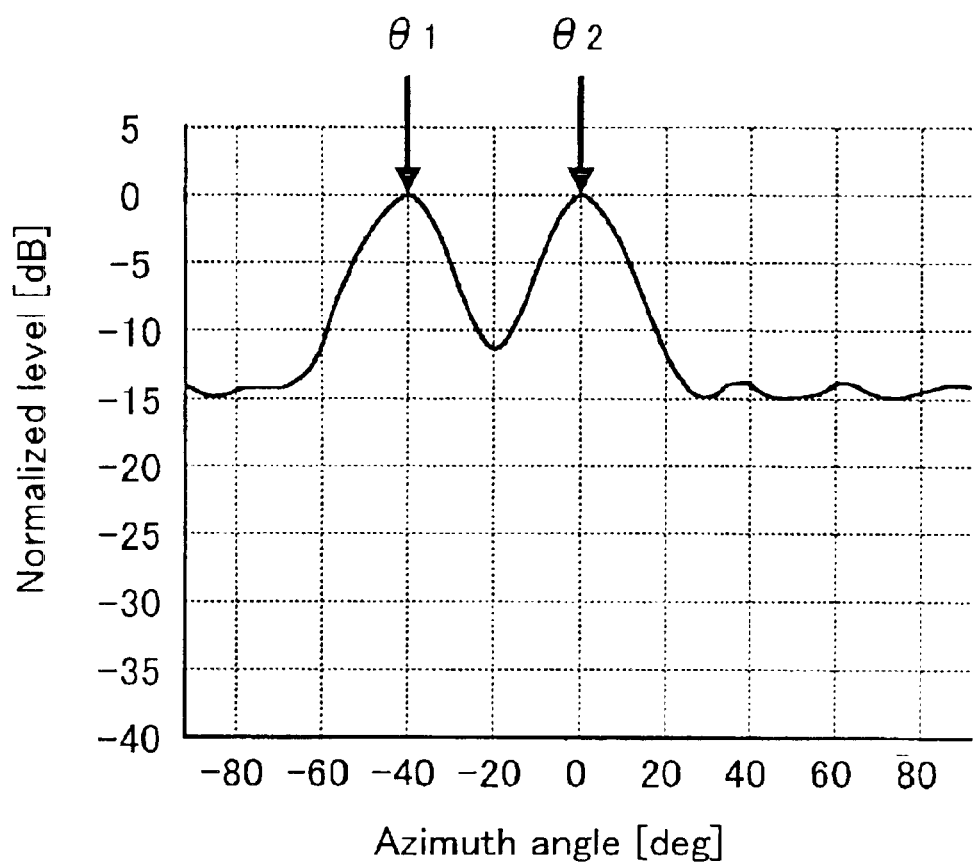
FIG. 4 shows one example of an angle spectrum which is obtained in a direction-of-arrival estimation section in the base station apparatus according to the embodiment 1 of the present invention.

Accordingly, two peaks appear on one angle spectrum, as shown in FIG. 4, when the angle spectrum is obtained by using signals expressed by the above formulae (12), (13) in the direction-of-arrival estimation section 105. In a word, a first peak appears at a position of $\theta_1$, and a second peak appears at a position of $\theta_2$.

Then, in the direction-of-arrival estimation section 105, a first peak position is estimated as the direction-of-arrival $\theta_1$ of the path-1 signal, and a second peak position is estimated as the direction-of-arrival $\theta_2$ of the path-2 signal. That is, it is estimated from one angle spectrum that the direction-of-arrival $\theta_1$ is as a direction of −40 degrees, and the direction-of-arrival $\theta_2$ is as a direction of 0 degrees. Thus, two directions-of-arrival are estimated at once from one angle spectrum in the direction-of-arrival estimation section 105. The estimated directions-of-arrival $\theta_1$, $\theta_2$ are output to the array receiving section 106.

In the array receiving section 106, the signals expressed by the above formula (12), and by the above formula (13) are multiplied by a receiving weight generated by using the directions-of-arrival $\theta_1$, $\theta_2$, respectively, and, thereafter, the signals subjected to the multiplication are combined.

For example, the array receiving section 106 generates a receiving weight expressed by the following formula (14), using $W(\theta_1)$ generated by substituting the direction-of-arrival $\theta_1$ into the above formula (6), and $W(\theta_2)$ generated by substituting -the direction-of-arrival $\theta_2$ into the above formula (6).

$$\frac{W(\theta_1) + W(\theta_2)}{2} \qquad (14)$$

Then, the signals expressed by the above formula (12), and by the above formula (13) are multiplied by the receiving weight expressed by the above formula (14), respectively, and, thereafter, the signals subjected to the multiplication are combined. Thereby, the base station apparatus may strongly receive only a signal arriving from a direction of $\theta_1$, and a signal arriving from a direction of $\theta_2$.

Thus, according to the present embodiment, directions-of-arrival may be estimated in the direction-of-arrival estimation section, using signals representing a plurality of components representing a phase rotation between each antenna element (that is, $e^{j\pi(n-1)\sin\theta m}$), as signals input to the direction-of-arrival estimation section are configured to be signals after RAKE combining. Accordingly, a plurality of directions-of-arrival may be estimated from one angle spectrum at once in the direction-of-arrival estimation section. Thereby, the amount of operations may be reduced.

Moreover, according to the present embodiment, the base station apparatus is required to be provided with only one direction-of-arrival estimation section every communication terminal, as all the directions-of-arrival may be estimated from one angle spectrum in the direction-of-arrival estimation section. Thereby, reduction in the size of the base station apparatus may be realized.

In addition, a number, which is equal to that of the paths, of lines connecting the direction-of-arrival estimation section and the array receiving section have been required to be provided in the above conventional base station apparatus, as a number, which is equal to that of the paths, of the direction-of-arrival estimation sections have been required to be provided. However, according to the present embodiment, only one line connecting the direction-of-arrival estimation section and the array receiving section is required, as only one direction-of-arrival section is required to be provided for every communication terminal. Accordingly, the size of the apparatus may be further reduced, and, at the same time, the manufacturing cost may be also suppressed.

And, according to the present embodiment, the direction-of-arrival estimation section is not required to be newly developed, and the conventional direction-of-arrival estimation section may be used as it is, as a plurality of directions-of-arrival may be estimated at once, using the same method as that of the conventional case. Accordingly, development cost may be suppressed when a-base station apparatus with small apparatus size is developed.

Figure 1:
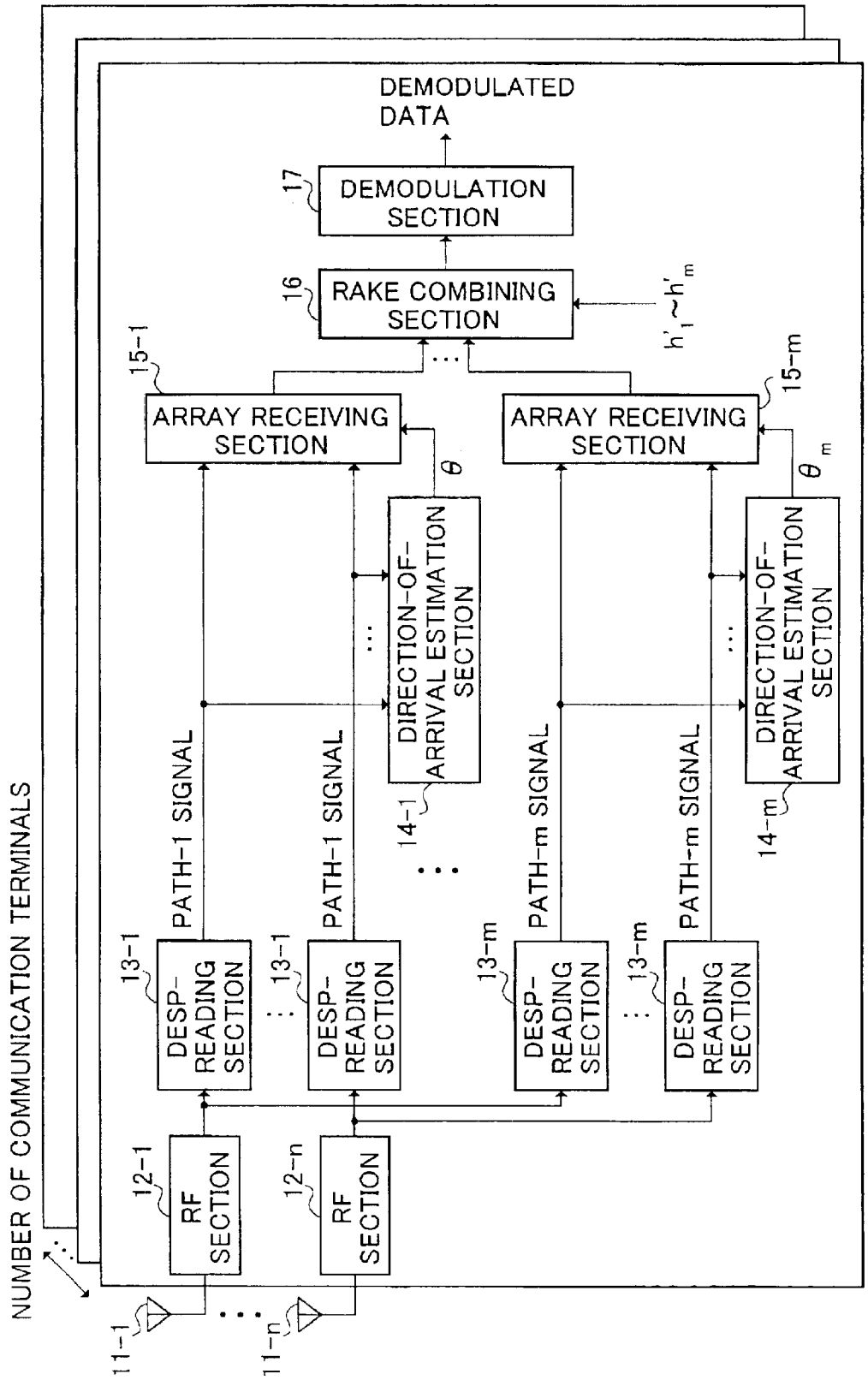
FIG. 1 is a block diagram showing a configuration of a conventional base station apparatus.
Figure 2B:
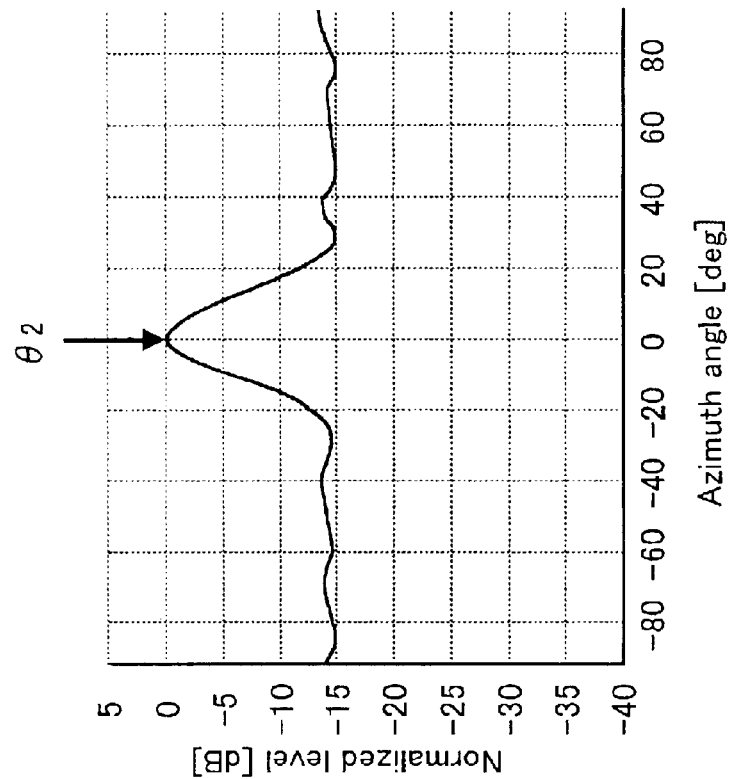
FIG. 2B shows another example of the angle spectrum which is obtained in the direction-of-arrival estimation section in the conventional base station apparatus.
Figure 2A:
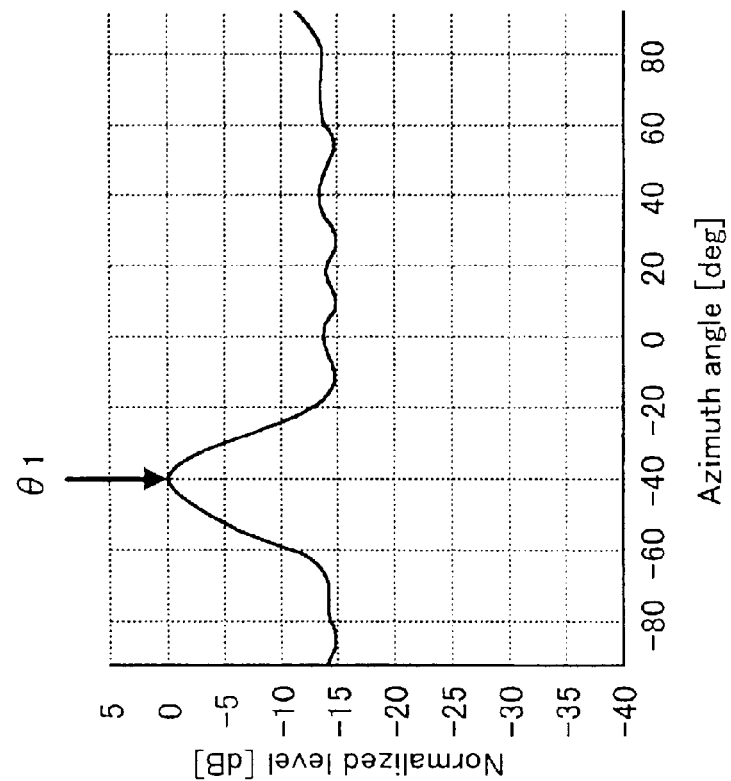
FIG. 2A shows one example of an angle spectrum which is obtained in a direction-of-arrival estimation section in the conventional base station apparatus.

Here, a number, which is equal to that of the antennas, of RAKE combining sections are required to be provided in the configuration shown in FIG. 3 when the configuration shown in FIG. 3, and the conventional one shown in FIG. 1 are compared. Accordingly, in the present embodiment, the number of the RAKE combining sections is increased in comparison with that of the conventional case. However, the amount of operations in the RAKE combining sections is remarkably small, comparing with that of matrix operations and so on required for estimating the directions-of-arrival. Accordingly, the apparatus size and the amount of operations may be reduced as the whole base station apparatus by reducing the number of direction-of-arrival estimation sections even if the number of the RAKE combining sections is increased.

(Embodiment 2)

Figure 5:
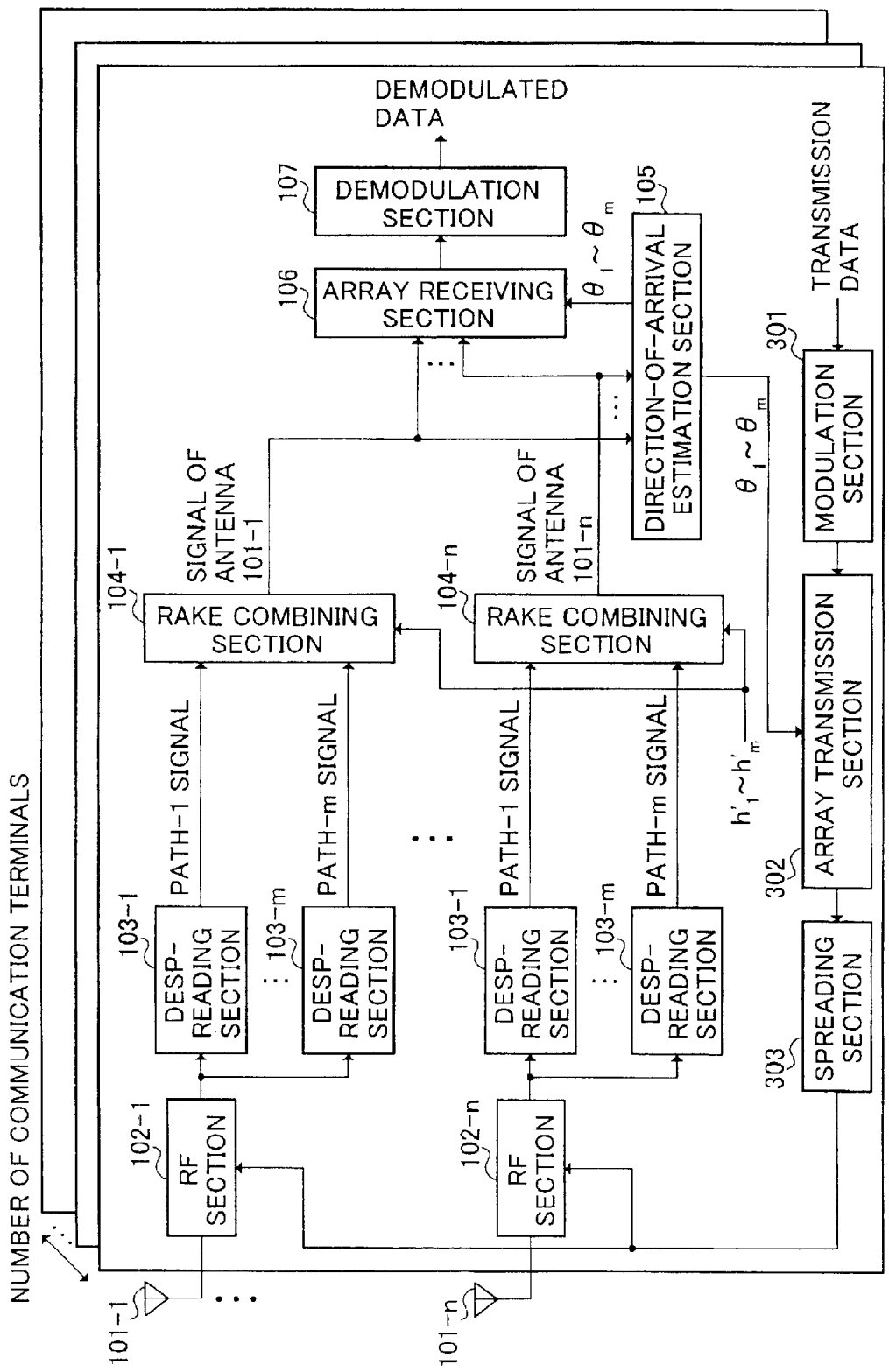
FIG. 5 is a block diagram showing a configuration of a base station apparatus according to an embodiment 2 of the present invention.

FIG. 5 is a block diagram showing a configuration of a base station apparatus according to the embodiment 2 of the present invention. The base station apparatus shown in FIG. 5 has a configuration in which a modulation section 301; an array transmission section 302; and a spreading section 303 are further provided in addition to sections shown in FIG. 3, and directions-of-arrival $\theta_1$ to $\theta_m$ which have been estimated in a direction-of-arrival estimation section 105 are configured to be used at signal transmission. Here, in FIG. 5, parts similar to those previously shown in FIG. 3 are denoted by the same reference numbers as those in FIG. 3, and detailed description will be eliminated.

In the base station apparatus shown in FIG. 5, the modulation section 301 modulates transmission data for output to the array transmission section 302. And, a direction-of-arrival estimation section 105 outputs estimated directions-of-arrival $\theta_1$ to $\theta_m$ to the array transmission section 302.

The array transmission section 302 generates transmission weights, using directions-of-arrival $\theta_1$ to $\theta_m$ which have been estimated in the direction-of-arrival estimation section 105. Then, the array transmission section 302 multiplies the signals output from the modulation section 301 by the transmission weights. Thereby, directivities for transmission signals are formed in the directions of angles of $\theta_1$ to $\theta_m$. The transmission signals after multiplication by the transmission weights are output to the spreading section 303.

The spreading section 303 spreads the output signals from the array transmission section 302, and outputs the signals after the spreading to a RF section 102. The RF section 102 performs predetermined radio processing (digital-to-analog conversion, up conversion, and soon) of the output signals from the spreading section 303, and, thereafter, transmits the signals to a communication terminal through antennas 101-1 to 101-n.

As described above, according to the present embodiment, directions-of-arrival $\theta_1$ to $\theta_m$, which have been estimated in one direction-of-arrival estimation section provided for every communication terminal, are used at transmitting signals. Thereby, according to the present embodiment, only one line connecting the direction-of-arrival estimation section and the array receiving section is required, though a plurality of the sections are required to be provided for every communication terminal. Accordingly, the size of the apparatus may be reduced, and, at the same time, the manufacturing cost may be suppressed in the base station apparatus which transmits signals under forming directivities by using an array antenna.

Here, in the above embodiments, signals which have arrived through each path have been combined, using RAKE combining. However, the combining method is not limited to the above one, and any combining methods, which can combine, for every antenna, signals which have arrived through each path, may be used in the present invention.

Moreover, the beamformer method has been listed as one example of a method for estimating directions-of-arrival in the above embodiments. However, the estimating method is not limited to the above one, and the present invention can be applied to-a base station apparatus using an estimation method other than the beamformer method.

In addition, the above embodiments have been described under assumption that a plurality of antennas are arranged straight at intervals of the half wave-length of a carrier wave. However, the configuration is not limited to the above one, and the present invention can be applied to all the base station apparatus which comprises a plurality of antennas, and forms directivities. That is, the present invention can be executed regardless of the arrangement of each antenna, as long as signals which have been combined for every antenna are signals including a plurality of components representing a phase rotation between antennas.

Furthermore, the base station apparatus used for a communication system using a CDMA method as a multiplexing method has been described in the above embodiments. However, the multiplexing method is not limited to the above one, and the present invention can be applied to a base station apparatus used in a communication system using a multiplexing method such as a TDMA method, and an OFDM method.

As described above, according to the present invention, path diversity gain may be obtained in a base station apparatus provided with an array antenna, and, moreover, the apparatus size may be reduced and the amount of operations at estimating directions-of-arrival may be reduced.

The present description is based upon claims from the prior Japanese Patent Application 2000-272543, filed on Sep. 8, 2000. The entire contents are incorporated herein by reference.

What is claimed is:

1. A base station apparatus comprising:
a receiver that receives same signals, which have arrived from a plurality of directions through different paths, using an array antenna having a plurality of antenna elements;
a first combiner that combines a plurality of said same signals, which have been received through each antenna element, for every antenna element; and
a direction-of-arrival estimator that estimates said plurality of directions at once, using signals combined by said first combiner.

2. A base station apparatus according to claim 1, wherein signals combined by said first combiner are signals including a plurality of components representing a phase rotation between said antenna elements.

3. A base station apparatus according to claim 1, wherein said direction-of-arrival estimator obtains one angle spectrum, using said signals combined by said first combiner, and estimates said plurality of directions at once by detecting a plurality of peak positions on said angle spectrum.

4. A base station apparatus according to claim 1, further comprising:

a second combiner which multiplies signals combined by said first combiner by receiving weights, generated by using directions estimated by said direction-of-arrival estimator, and, thereafter, combines said signals after multiplication,
wherein directivity is formed in directions estimated by said direction-of-arrival estimator, and signals are received.

5. A base station apparatus according to claim 1, further comprising:
a transmitter which multiplies a transmission signal by a transmission weight generated by using directions estimated by said direction-of-arrival estimator, and, thereafter, transmits the signal after multiplication,
wherein directivity is formed in directions estimated by said direction-of-arrival estimator, and the weighted signal is transmitted.

6. A direction-of-arrival estimating method comprising:
receiving same signals, which have arrived from a plurality of directions through different paths, using an array antenna having a plurality of antenna elements;
generating signals including a plurality of components representing a phase rotation between antenna elements by combining a plurality of said same signals which have been received through each antenna element;
obtaining one angle spectrum, using said generated signals; and
estimating said plurality of directions at once by detecting a plurality of peak positions of said angle spectrum.

7. A base station apparatus comprising:
a receiver that receives same signals, which have arrived from a plurality of directions through different paths, using an array antenna having a plurality of antenna elements;
a first combiner, provided per antenna element, that combines a plurality of said same signals, which have been received through each antenna element, for every antenna element; and
a direction-of-arrival estimator that estimates said plurality of directions at once, using signals combined by said first combiner,
wherein said first combiner combines said plurality of said same signals while retaining components representing a phase rotation between said plurality of antenna elements with one of said antenna elements being a reference point.

8. A direction-of-arrival estimating method comprising:
receiving same signals, which have arrived from a plurality of directions through different paths, using an array antenna having a plurality of antenna elements;
combining a plurality of said same signals which have been received through each antenna element for every antenna element while retaining components representing a phase rotation between said plurality of antenna elements with one of said antenna elements being a reference point;
obtaining one angle spectrum using said combined signals; and
estimating said plurality of directions at once by detecting a plurality of peak positions of said angle spectrum.

* * * * *